United States Patent
Kumhyr et al.

(10) Patent No.: US 8,006,097 B2
(45) Date of Patent: Aug. 23, 2011

(54) PASSWORD GENERATION USING GENRE SELECTION

(75) Inventors: David B. Kumhyr, Austin, TX (US); Pamela A. Nesbitt, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 1240 days.

(21) Appl. No.: 11/669,292

(22) Filed: Jan. 31, 2007

(65) Prior Publication Data

US 2008/0184362 A1 Jul. 31, 2008

(51) Int. Cl.
*G06F 21/00* (2006.01)

(52) U.S. Cl. ............................ 713/183; 713/168; 726/18

(58) Field of Classification Search .................. 713/168, 713/183; 726/18
See application file for complete search history.

(56) References Cited

U.S. PATENT DOCUMENTS

| | | | |
|---|---|---|---|
| 5,261,000 A | | 11/1993 | Hamamoto |
| 5,928,364 A | * | 7/1999 | Yamamoto .................... 726/18 |
| 5,991,882 A | * | 11/1999 | O'Connell .................... 726/18 |
| 7,051,209 B1 | * | 5/2006 | Brickell ....................... 713/183 |
| 7,065,786 B2 | * | 6/2006 | Taguchi ........................... 726/18 |
| 7,363,585 B1 | * | 4/2008 | Sierra et al. .................... 715/710 |
| 2003/0105959 A1 | * | 6/2003 | Matyas et al. ................. 713/168 |
| 2004/0088587 A1 | * | 5/2004 | Ramaswamy et al. ........ 713/202 |
| 2005/0044425 A1 | | 2/2005 | Hypponen |
| 2005/0076224 A1 | * | 4/2005 | Royer ............................ 713/183 |
| 2005/0160297 A1 | | 7/2005 | Ogawa |

* cited by examiner

*Primary Examiner* — Kambiz Zand
*Assistant Examiner* — Amare Tabor
(74) *Attorney, Agent, or Firm* — Dillon & Yudell LLP

(57) ABSTRACT

Presently disclosed herein are a method, system, and computer-readable medium for managing a user-defined genre-based password. In one embodiment, the method includes steps for creating a genre-based tree that can be used to prompt a user in remembering a user-created password. In an exemplary embodiment, the method for creating the password includes the steps of: presenting, to a user, a first question; receiving, from the user, a first input answer to the first question; presenting, to the user, a subsequent question that is based on the first input answer to the first question; receiving, from the user, a subsequent input answer to the subsequent question; and based on the first input answer and the subsequent input answer, creating a pathway of nodes, in a genre-based tree, to a correct end-node, wherein content of the correct end-node, which is based on the subsequent input answer, provides a basis for a user-defined password, and wherein the content of the correct end-node prompts the user to remember the user-defined password.

16 Claims, 10 Drawing Sheets

PASSWORD GENERATION USING GENRE SELECTION

BACKGROUND OF THE INVENTION

1. Technical Field

The present disclosure relates in general to the field of computers, and in particular to computer software. Still more particularly, the present disclosure relates to an improved method, system and computer-readable medium for aiding a user in remembering a user-defined password.

2. Description of the Related Art

Computer applications, including those that provide access to privileged information, often require the user to define and subsequently utilize a password to afford access to the privileged information. For example, a webpage may require a user to enter a password to access bank account information, subscriber-based information, etc. Thus, to aid the user in later remembering the password, the computer application may allow the user to define his/her own password. However, allowing a user to set her own password poses problems.

First, a user-defined password can be broken using simple assumptions. That is, most people use the name of a child, pet or spouse as a password. Knowing this information makes it easy for a wrongdoer to guess the user's password. Thus, most user-created passwords are not very secure.

Second, even user-created passwords can be hard for the user to remember if the user has different passwords for different applications. Thus, even if the user uses the same basis for all of his user-defined passwords (e.g., the name of his child), different applications/webpages/etc. may have different password formats, such that the actual passwords differ. For example, some formats may require the password to be at least six characters long, while others require the password to be exactly eight characters long, while others require the password to include at least one numeral, etc.

SUMMARY OF THE INVENTION

To address the problems presented above, disclosed herein is a method, system, and computer program product for aiding a user in remembering a password that is not immediately intuitive to a hacker. In one embodiment, the method includes steps for creating a genre-based tree that can be used to prompt a user in remembering a user-created password. In an exemplary embodiment, the method for creating the password includes the steps of: presenting, to a user, a first question; receiving, from the user, a first input answer to the first question; presenting, to the user, a subsequent question that is based on the first input answer to the first question; receiving, from the user, a subsequent input answer to the subsequent question; and based on the first input answer and the subsequent input answer, creating a pathway of nodes, in a genre-based tree, to a correct end-node, wherein content of the correct end-node, which is based on the subsequent input answer, provides a basis for a user-defined password, and wherein the content of the correct end-node prompts the user to remember the user-defined password.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
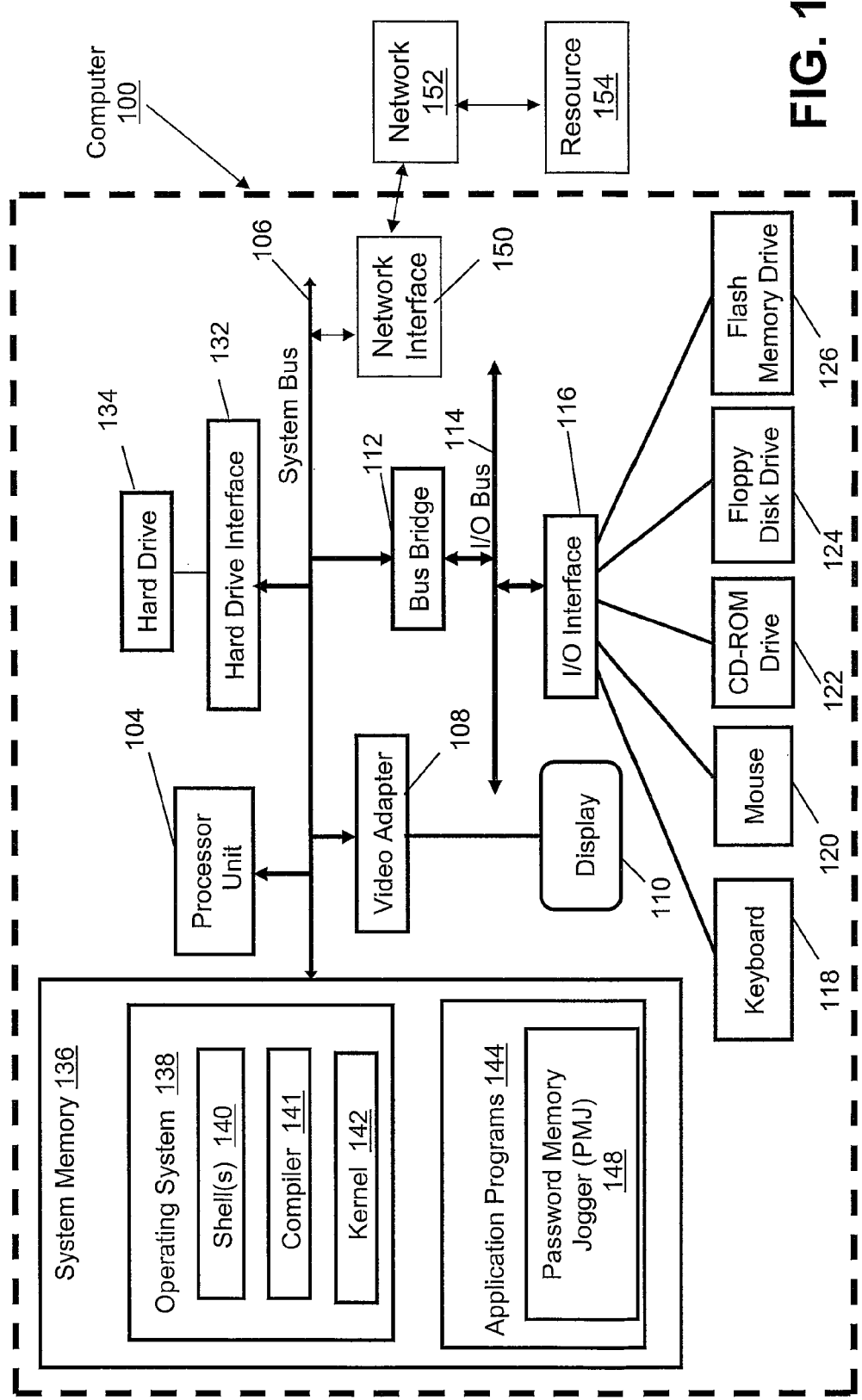
FIG. 1 depicts an exemplary computer on which the presently disclosed method may be implemented.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

A hard drive interface 132 is also coupled to system bus 106. Hard drive interface 132 interfaces with a hard drive 134. In a preferred embodiment, hard drive 134 populates the system memory 136, which is also coupled to system bus 106. System memory is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. More specifically, shell 140 executes commands that are entered into a command line user interface. Thus, shell 140, also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and mouse and keyboard management. OS 138 also includes a compiler 141 that is utilized by users of computer 100 to transform high level source code into executable (i.e. executable) object code. In an alternate embodiment, compiler 141 may be included in application programs 144.

Application programs 144 in system memory 136 include a Password Memory Jogger (PMJ) 148. In one embodiment, PMJ 148 performs the steps illustrated in FIGS. 9-10, and also creates/executes/deploys the tree shown in FIG. 2 and the webpages shown in FIGS. 3-8, all of which are discussed below. Although illustrated as a single component, in some embodiments PMJ 148 may be formed of multiple software components.

A network interface 150 is coupled to system bus 106. Network interface 150 allows computer 100 to communicate, via a network 152, to other resources 154, which may be a server, a supervisory computer, a management computer, a database, a web server, etc.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

It is understood that the use herein of specific names are for example only and not meant to imply any limitations on the invention. The invention may thus be implemented with different nomenclature/terminology and associated functionality utilized to describe the above devices/utility, etc., without limitation.

Figure 2:
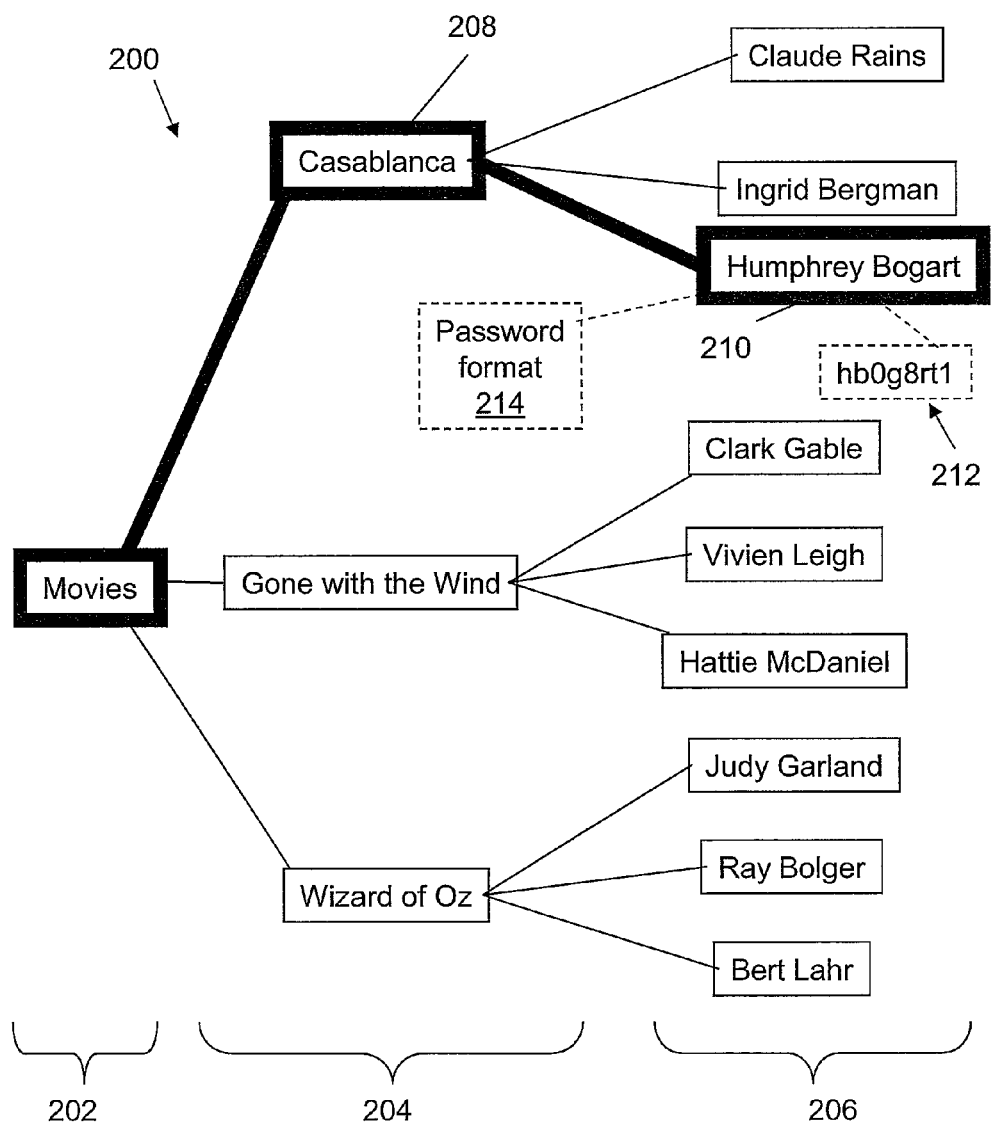
FIG. 2 illustrates a genre-based tree that includes an end-node, which describes a key component of a genre-based user-defined password.

Referring now to FIG. 2, a genre-based tree 200 is presented. This tree is automatically generated via software, such as PMJ 148 shown in FIG. 1, based in part on user inputs described above. Genre-based tree 200 includes a base node 202, at least one set of branch nodes 204, and a set of end-nodes 206. As will be described below, the purpose of genre-based tree 200 is to generate a decision tree that jogs a user's memory of a password that was created/set by the user for a particular application, website, database, etc. In the example shown for genre-based tree 200, the "correct" pathway from the base node 202 includes the branch node 208 ("Casablanca") and end-node 210 ("Humphrey Bogart"). As will be understood by the description below, this "correct" pathway is generated by a user selecting "Casablanca" as her favorite movie, and "Humphrey Bogart" as her favorite actor in "Casablanca." Thus, "Humphrey Bogart" is the basis of a password created by the user. The other branches (e.g., "Gone with the Wind" and "Wizard of Oz") are preferably generated by PMJ 148 without any input from the user. Similarly, other end-nodes (e.g., "Claude Rains," "Ingrid Bergman," "Clark Gable," et al.) are also preferably generated by PMJ 148 without any input from the user. Other end-nodes (e.g., that for "Clark Gable," "Judy Garland", et al.) may or may not be created by PMJ 148 if PMJ 148 is designed to only provide nodes to lower-levels in the tree for correct high-level tree levels. Note that in an alternative embodiment, genre-based tree 200 may also include a leaf 212, which is directly associated with end-node 210, that includes the actual user-defined password. Furthermore, genre-based tree 200 may include password formatting instructions 214 specific for an application to which the genre-based tree 200 is assigned.

That is, within or associated with genre-based tree 200 may be information that states that the application requires the password to have more than eight characters, have at least one numeral in the password, etc. Password formatting instructions 214 may also include user preferences, such as replacing vowels with numerals.

Figure 3:
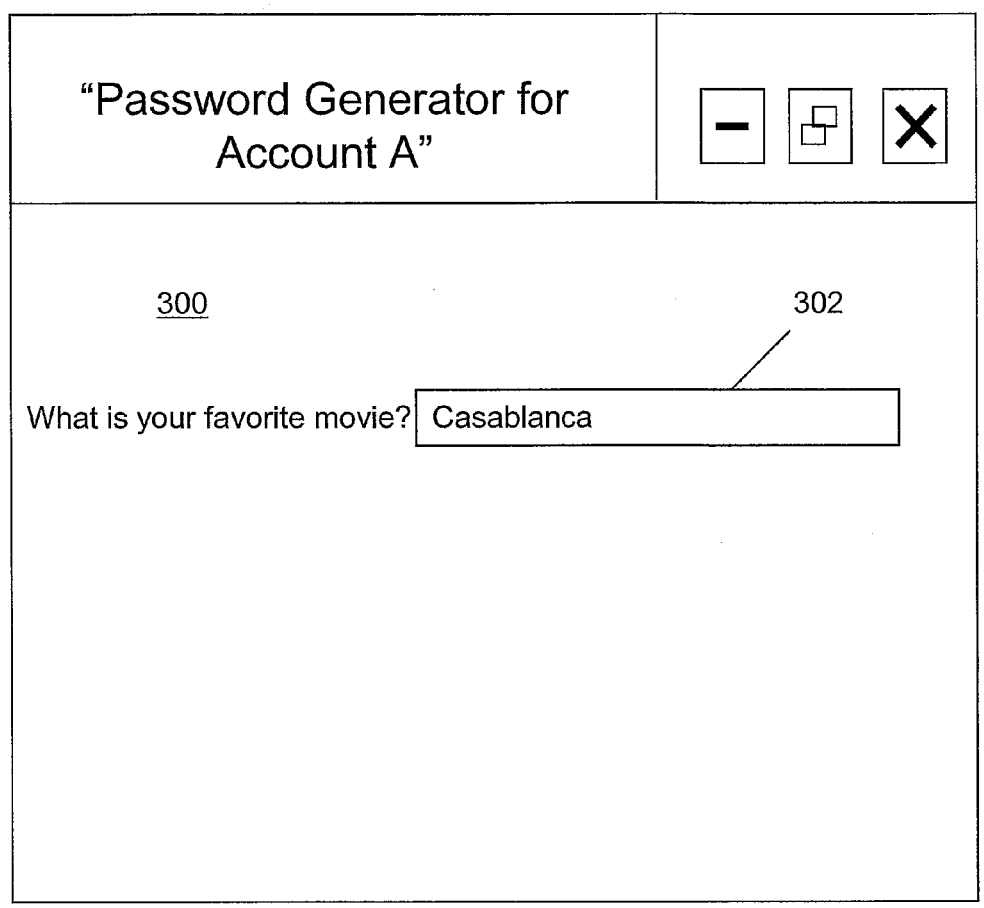
FIGS. 3-5 depict User Interfaces (UIs) for allowing a user to create the genre-based user-defined password.
Figure 4:
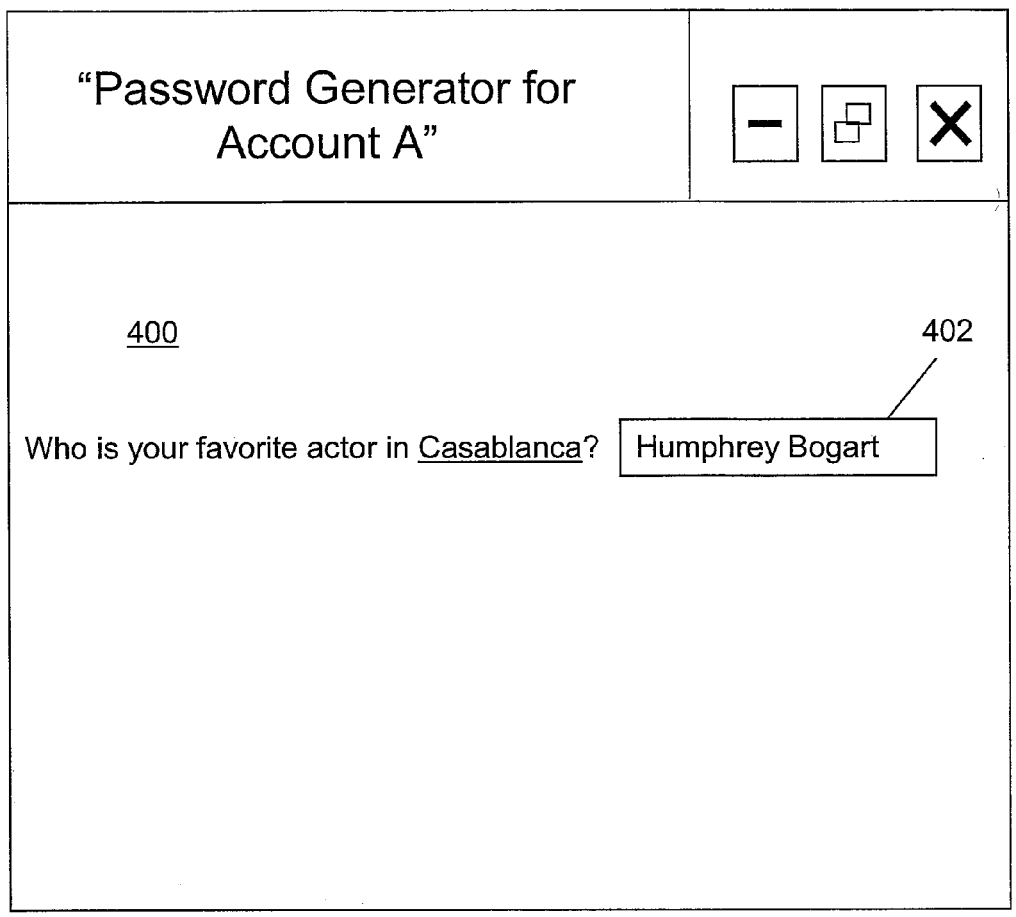
Figure 5:
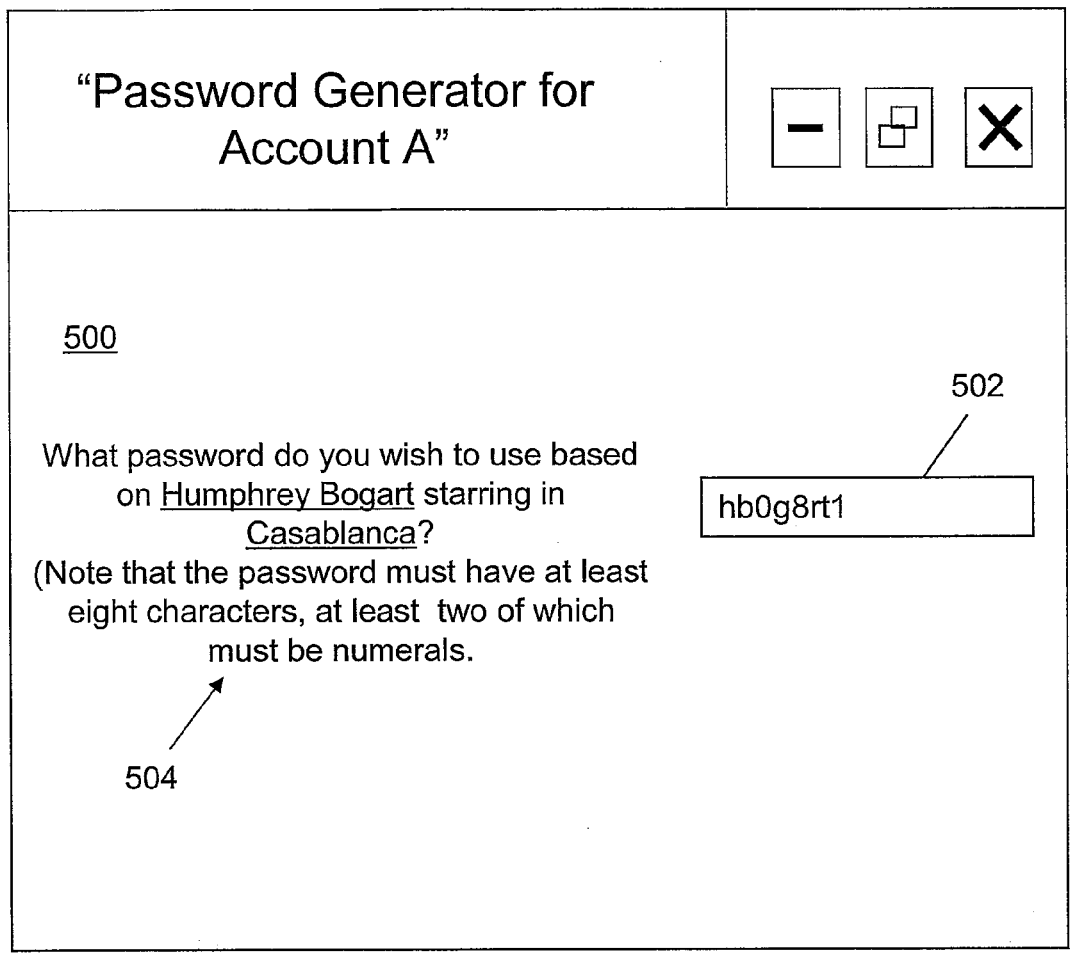

FIGS. 3-6 present exemplary User Interfaces that may be used to construct the correct pathway shown in FIG. 2. With reference then to FIG. 3, a first User Interface (UI) 300, which may be part of a webpage, local application, etc., is presented. Within UI 300 is a data entry box 302, into which a user types the name of her favorite movie. The question about a movie is based on the base node 202, shown in FIG. 2, which defines the genre ("movies") for the genre-based tree 200. As suggested in UI 400 in FIG. 4, the user typed "Casablanca" as her favorite movie, which prompted her to type into data entry box 402 the name of her favorite actor from that movie. As shown in FIG. 5, based on her favorite actor being "Humphrey Bogart," the user then creates and enters "hb0g8rt1" in block 502 as her password for "Account A." Note that UI 500 includes an instruction block 504 provides a prompt message to the user regarding the password rules of "Account A" for creating a password.

Figure 6:
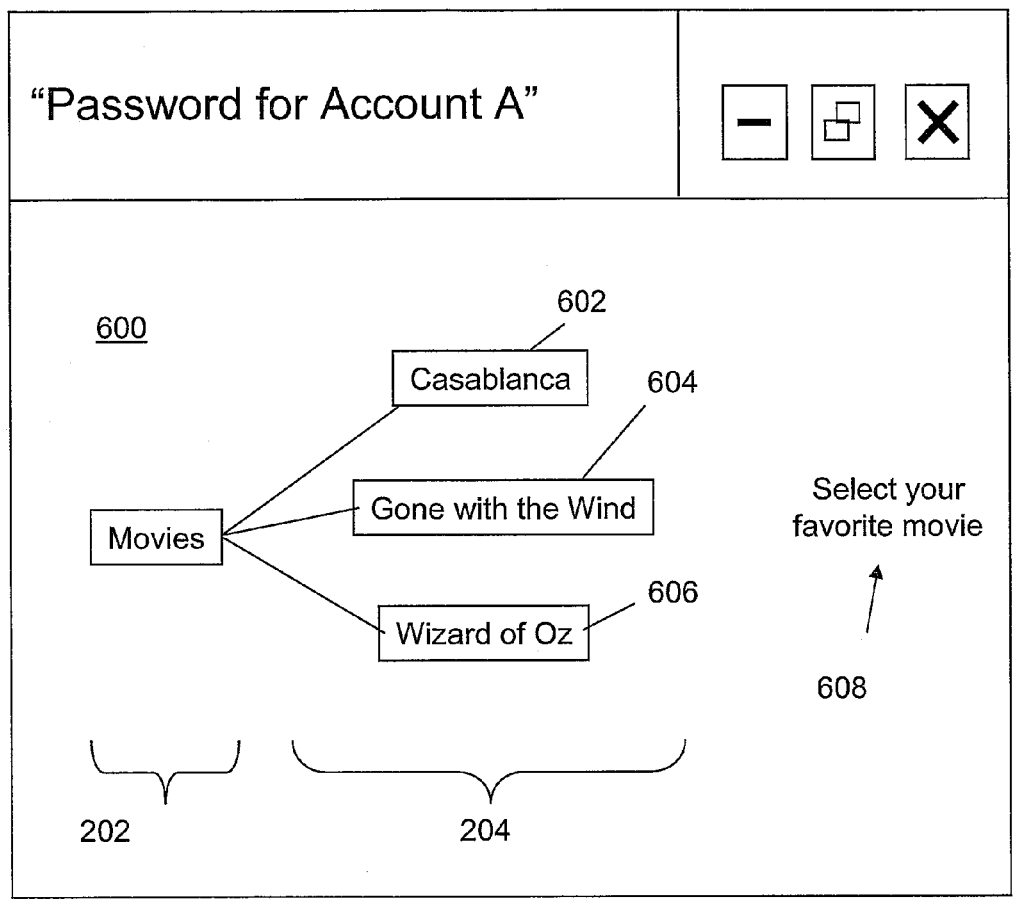
FIGS. 6-8 depict UIs that allow the user to navigate through the genre-based tree to arrive at the end-node that describes the key component of the user-defined password shown in FIG. 2.
Figure 7:
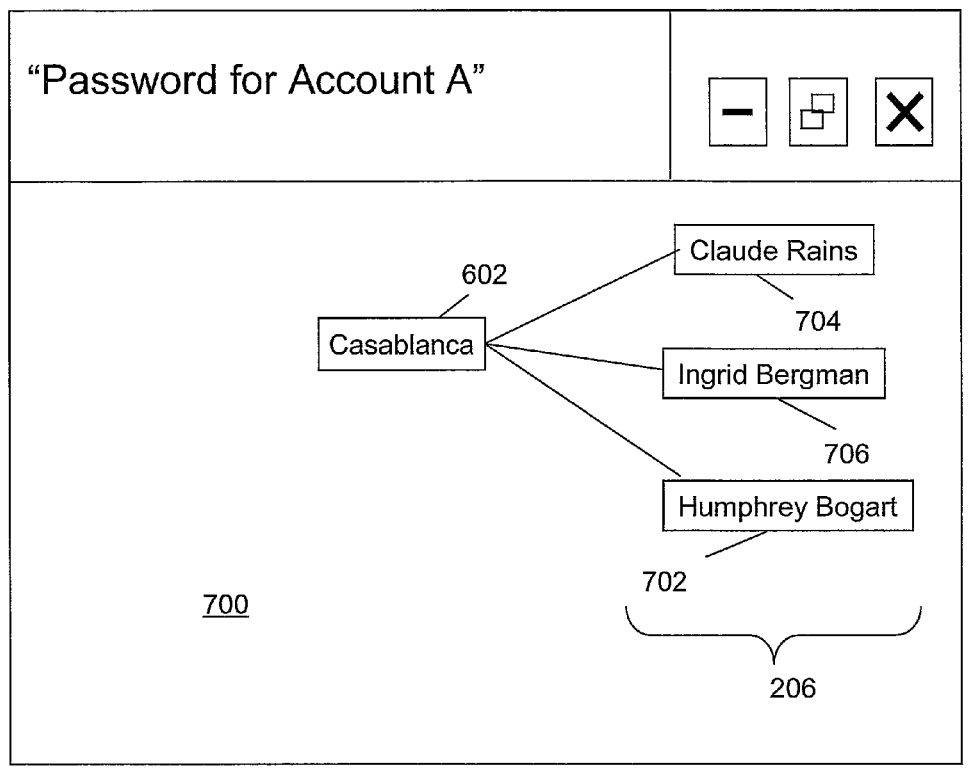
Figure 8:
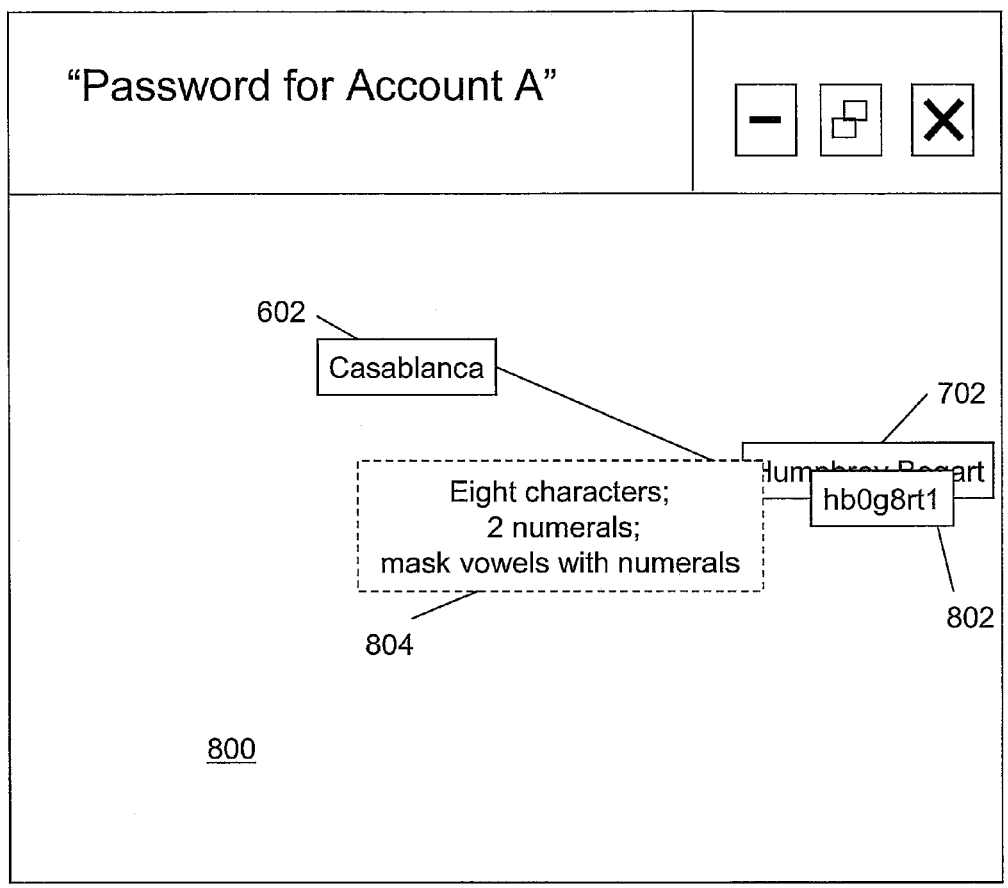

With reference now to FIG. 6, assume that the user wants to access data from "Account A," and thus needs his self-created password. Also assume that the user cannot remember what that password is. The user then accesses a program or webpage, which is under the control of PMJ 148 described in FIG. 1, to obtain this password. Under the direction of PMJ 148, the user is directed to the UI 600 from a webpage link, an option box in a UI, etc. UI 600 includes a message 608 that instructs the user to select his favorite movie from active blocks 602, 604 and 606, which are associated with the branch nodes 204 of tree 200 described above in FIG. 2. In the example shown, if the user clicks block 602, then UI 700 of FIG. 7 will be presented to him. If he clicks box 604 or 608, then UI 700 will NOT be presented. Note that the entry of "Casablanca" for block 602 was generated by the user, while the entries of "Gone With The Wind" and "Wizard of Oz" for respective blocks 604 and 606 are automatically generated by PMJ 148, preferably by utilizing information in a movie information database.

Assuming that block 602 for "Casablanca" was properly clicked, then various active blocks associated with end-nodes 206 are presented. According to genre-based tree 200, blocks 704 and 706 are wrong, while block 702 for "Humphrey Bogart" is correct. The process may end at this point, having guided the user to recall that he used "Humphrey Bogart" as the basis of his password, and thus can remember what password he created from the name "Humphrey Bogart." In another embodiment, however, the user can be provided additional information, as shown in UI 800 in FIG. 8. For example, by clicking block 702, a message block 802 can appear, showing the actual password that the user created (as described in FIG. 5) was "hb0g8rt1." If more security is desired, then a message block 804 can pop-up, prompting the user with the additional clue that the password must be at least eight characters long and uses two numerals, as defined by password formatting instructions 214 shown in FIG. 2. Furthermore, message block 804 can provide user-specific and user-defined preferences, such as replacing all vowels with a numeral (to get "hb0g8rt" instead of "hbogart").

Note that while only portions of the genre-based tree 200 are shown in FIGS. 5-8, alternatively the entire genre-based tree 200 may be shown on a same UI, such that the user is allowed to see all end-nodes 206 at the same time.

Figure 9:
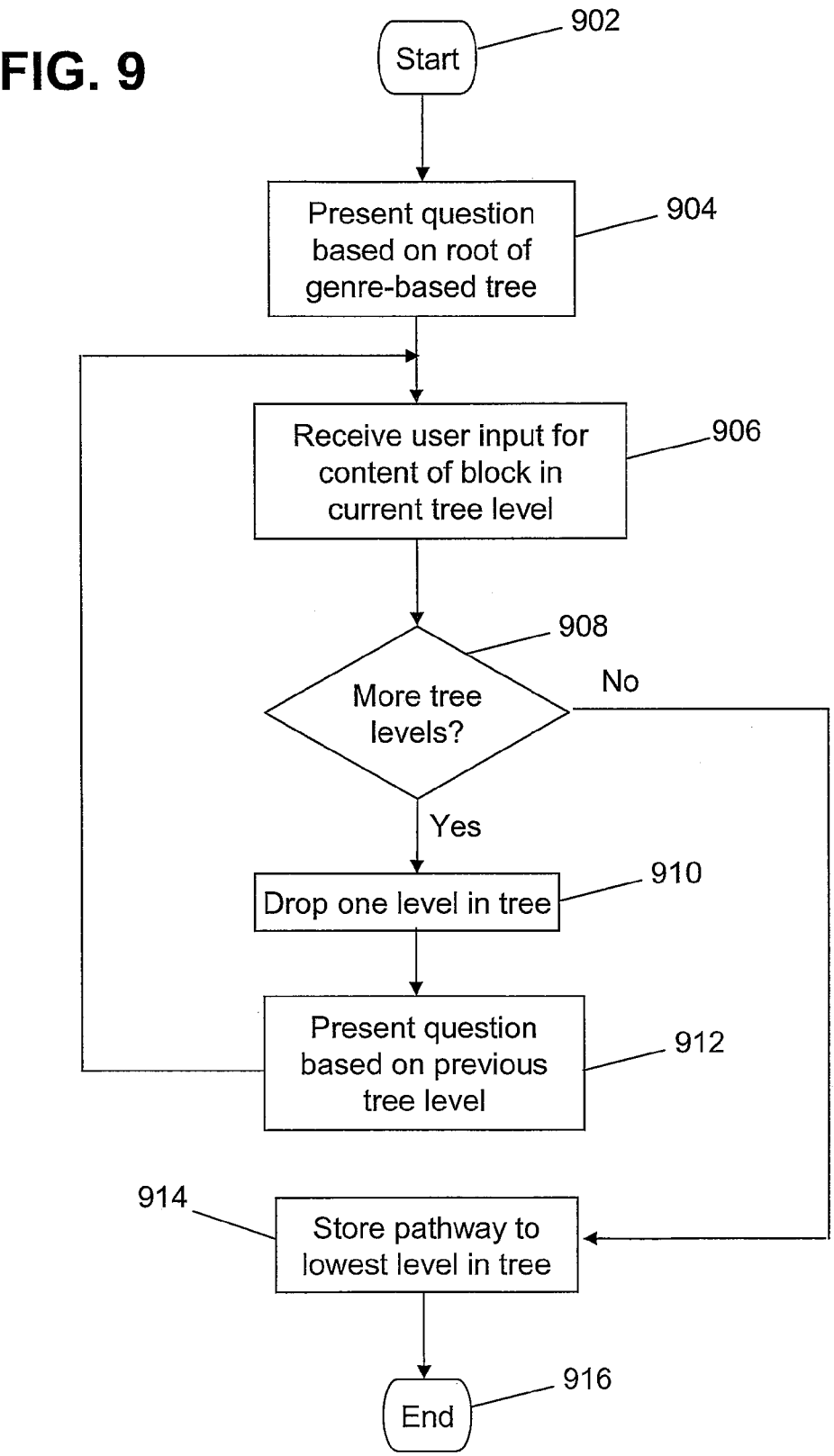
FIG. 9 is a high level logical flowchart of an exemplary method of creating the genre-based tree.

Referring now to FIG. 9, a flow-chart of exemplary steps taken to create a pathway to the correct end-node 210 or 212, and/or in the genre-based tree 200, is presented. After initiator block 902, a question based on the root (e.g., base node 202 shown in FIG. 2) is presented (block 904). In the example described above in FIG. 3, this question, based on the root "Movies," is "What is your favorite movie?" A user input, based on the question, is then received, and is used as the content of a block in a next lower level in the genre-based tree 200 (block 906). For example, if the user entered "Casablanca" in data entry box 302 shown in FIG. 3, then "Casablanca" would be the content of the block for branch node 208 shown in FIG. 2.

If there are more tree levels at a lower level than the current tree level (query block 908), then the tree level is dropped one level (block 910). For example, the tree level being utilized may drop from branch nodes 204 to end-nodes 206 in the genre-based tree 200 shown in FIG. 2. Thereafter, a question based on the prior level of the genre-based tree is presented (block 912). For example, the question "Who is your favorite actor in Casablanca?", as shown in FIG. 4, is presented, based on the prior level (branch node 204), in which "Casablanca" was identified as a favorite movie. The process continues in an iterative manner until an end-node is reached (e.g., the "hint" end-node 210 containing "Humphrey Bogart" or the "actual password" end-node 212 containing "hb0g8rt1". The pathway leading to this lowest level in the tree is then stored (block 914), and the process ends (terminator block 916). Note that in one embodiment, a rule associated with a particular application for passwords may also be stored, either as part of the database that defines genre-based tree 200 or in another memory location accessible to a password management program such as PMJ 148 described above in FIG. 1.

Figure 10:
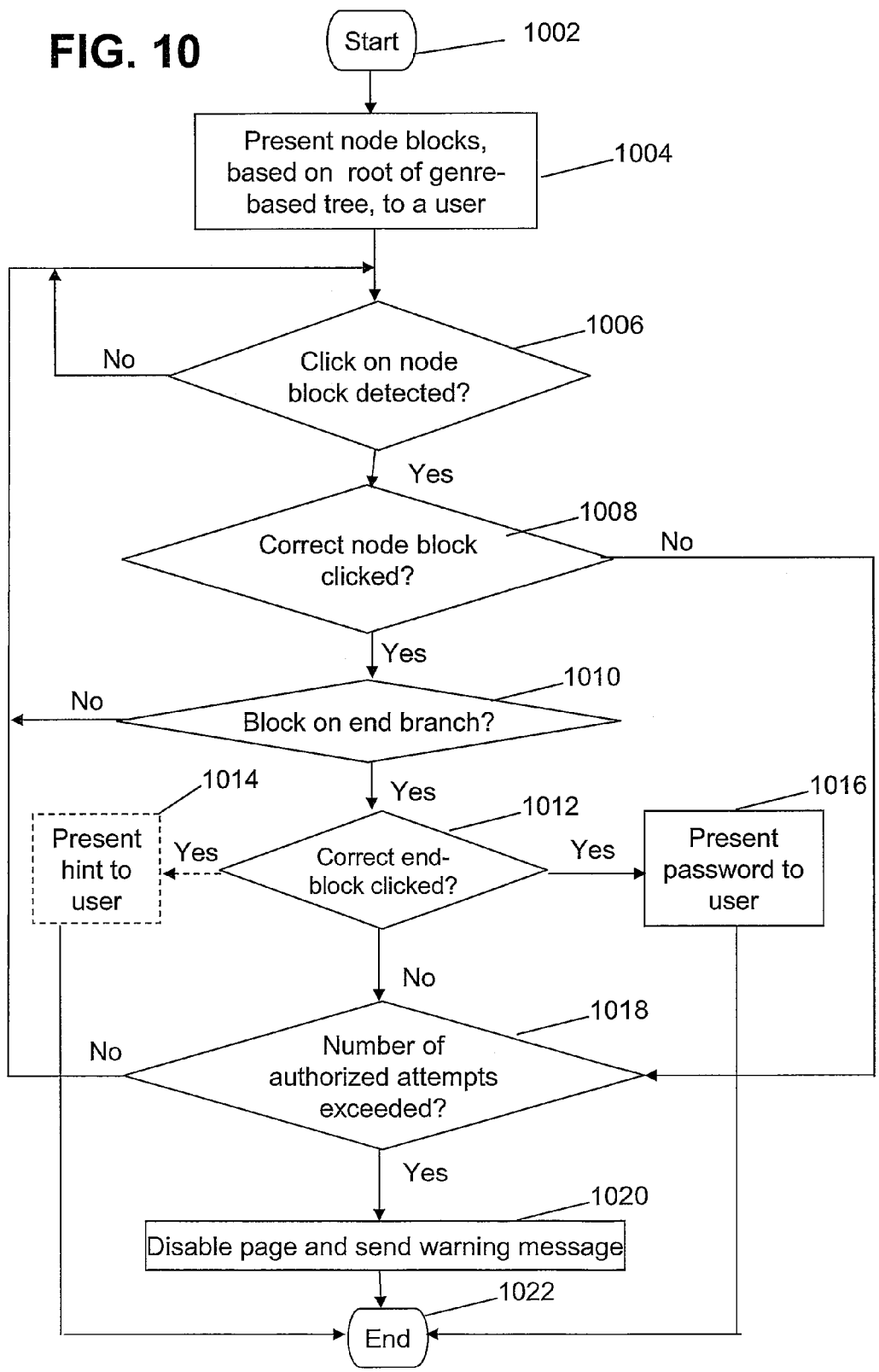
FIG. 10 is a high level logical flowchart of an exemplary method of walking a user through the genre-based tree to arrive at the end-node that describes the key component of the genre-based user-defined password.

Referring now to FIG. 10, a flow-chart of exemplary steps taken to present contents of the genre-based tree 200 to a user is presented. After initiator block 1002, which may be prompted by a user clicking a link, from a webpage, indicating a need to recall her password, questions based on the root node (e.g., "movies") and first branch nodes (e.g., blocks for "Casablanca," "Gone With The Wind," and "Wizard of Oz") of a user-defined genre-based tree are presented in a UI to the user (block 1004). If a click of a block (corresponding to a branch or leaf in genre-based tree 200) on that presented branch is detected (query block 1006), a query is made (query block 1008) to determine if the clicked block is correct, according to the "correct" pathway generated by the user for the underlying genre-based tree. If the correct block was not clicked, then the user may be given another chance to click the correct block (query block 1018), or else the password memory jogging page may be disabled (block 1020) and the process ends (terminator block 1022). However, if the correct block was clicked in the branch (query block 1008), the next lower-level blocks are presented in an iterative manner until the final end-block is reached (query block 1010), at which point the contents of blocks associated with both the correct and incorrect end-nodes (e.g., blocks for the correct "Humphrey Bogart" and the incorrect "Ingrid Bergman" and "Claude Rains") are presented (query blocks 1006, 1008, and 1010). If the user clicks the correct end-node block (query block 1012), then he is either presented with another memory jogging hint (block 1014), such as block 804 shown in FIG. 8, or is given the actual password (block 1016), such as block 802 shown in FIG. 8, thus ending the process (terminator block 1022). However, if the user clicks the wrong end-node block, then the page is disabled (block 1020), assuming that he has used up all of his chances (block 1018). As noted in block 1020, a message can also be sent to an administrator, such as a supervisory computer shown as resource 154 in FIG. 1, informing the administrator that an attempt to utilize the genre-based tree has failed, thus possibly prompting further investigation or actions by the administrator. Note that in an alternative embodiment, the process actually ends when the user reaches the end-node for "Humphrey Bogart" (query block 1010), thus only giving the user the hint of "Humphrey Bogart" in remembering the password that he created.

It is to be understood that at least some aspects of the presently disclosed method may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media, including but not limited to tangible computer-readable media, when carrying or encoded with a computer program having computer readable instructions that direct method functions in the present invention, represent alternative embodiments of the present invention. Further, it is understood that the present invention may be implemented by a system having means in the form of hardware, software, or a combination of software and hardware as described herein or their equivalent.

Presently disclosed herein are a method, system, and computer-readable medium for managing a user-defined genre-based password. In one embodiment, the method includes steps for creating a genre-based tree that can be used to prompt a user in remembering a user-created password. In an exemplary embodiment, the method for creating the genre-based tree includes the steps of: presenting, to a user, a first question; receiving, from the user, a first input answer to the first question; presenting, to the user, a subsequent question that is based on the first input answer to the first question; receiving, from the user, a subsequent input answer to the subsequent question; and based on the first input answer and the subsequent input answer, creating a pathway of nodes, in a genre-based tree, to a correct end-node, wherein content of the correct end-node, which is based on the subsequent input answer, provides a basis for a user-defined password, and wherein the content of the correct end-node prompts the user to remember the user-defined password.

This method may further include the step of reiterating the steps of presenting the subsequent question and receiving the subsequent input answer to create a genre-based tree that has more than two levels of sub-nodes; mapping the contents of the correct end-node to a specific program; and storing the contents of the correct end-node in association with the specific program. This method may also include the step of storing at least one password rule, associated with the specific program, in association with the genre-based tree.

In another embodiment, the method includes steps for allowing a user to view an end-node in the genre-based tree, thus providing the user with a mental prompt to remember what password he created. In an exemplary embodiment of this method, steps include: presenting, to a user, contents of a first plurality of nodes in a genre-based tree, wherein the first plurality of nodes represent a subcategory of a parent node, and wherein the first plurality of nodes include a correct node that contains content that has been input previously by the user, and wherein the first plurality of nodes include at least one incorrect node that contains content that has not been input previously by the user; receiving, from the user, an input that selects one of the first plurality of nodes; in response to the user selecting the correct node, presenting at least one subsequently lower-level plurality of nodes and receiving a corresponding selection of one of the subsequently lower-level plurality of nodes from the user until an end-node of the genre-based tree is reached, wherein the end-node is reached only if the user continues to select nodes that correspond with nodes that have been previously populated with data that was input by the user to create a correct pathway in the genre-based tree; and in response to the end-node of the genre-based tree being reached, presenting the user with a content that is associated with the end-node. This method may further include the step of, in response to the user selecting a node that is not populated with data that was previously input by the user during a creation of the genre-based tree, denying, to the user, access to the end-node. The end-node may cause a password, for a specific program, to be presented to the user, or the end-node may cause a hint that describes a password, for a specific program, to be presented to the user, wherein the hint includes format requirements for the password for the specific program.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a processor-implemented method of managing a user-defined genre-based password, the method comprising:
   the processor presenting a first question, via a user interface, wherein the first question is based on a genre-based root node in a genre based tree;
   receiving, via a first input entered in the user interface, a first answer to the first question;
   presenting, via the user interface, a subsequent question that is based on the first answer to the first question and a subsequent level node in the genre based tree;
   receiving, via a second input entered in the user interface, a subsequent answer to the subsequent question, wherein the subsequent answer is stored in a lower-level branch node in the same genre-based tree as the genre-based root node; and
   based on the first answer and the subsequent answer, creating a pathway of nodes, in the genre-based tree, to a correct end-node, wherein the correct end-node is a lower-level branch node, wherein content of the correct end-node is based on the subsequent answer and provides a basis for a user-defined password, and wherein the content of the correct end-node prompts a user to remember the user-defined password;
   wherein answers received in response to the first question and the subsequent question are utilized for managing a user-defined genre-based password.

2. The method of claim 1, further comprising:
   reiterating the steps of presenting the subsequent question and receiving the subsequent input answer to create a genre-based tree that has more than two levels of sub-nodes.

3. The method of claim 1, further comprising:
   mapping the contents of the correct end-node to a specific program; and
   storing the contents of the correct end-node in association with the specific program.

4. The method of claim 3, further comprising:
   storing at least one password rule, associated with the specific program, in association with the genre-based tree.

5. In a data processing system, a computer-based method of aiding a user in remembering a password for a specific program, the method comprising:
   a processor presenting, via a user interface, contents of a first plurality of nodes in a genre-based tree, wherein the first plurality of nodes represent a subcategory of a parent node, and wherein the first plurality of nodes include a correct node that contains content that has been input previously by the user, wherein the first plurality of nodes include at least one incorrect node that contains content that has not been input previously by the user, and wherein the content of the incorrect nodes is automatically generated from an information database corresponding to a same genre as the parent node;
   receiving, via the user interface, an input that selects one of the first plurality of nodes;
   in response to receiving a selection of the correct node:
      presenting at least one subsequently lower-level plurality of nodes, wherein the at least one subsequently lower-level plurality of nodes is in the same genre-based tree as the genre-based root node;
      receiving a selection of one of the subsequently lower-level plurality of nodes;
      repeating the presenting of at least one subsequently lower-level plurality of nodes and receiving a selection of one of the subsequently lower-level plurality of nodes until an end-node of the genre-based tree is reached, wherein the end-node is reached only if nodes that correspond with nodes that have been previously populated with data that was input by the user are correctly selected to create a correct pathway in the genre-based tree; and
   in response to the end-node of the genre-based tree being reached, presenting a content that is associated with the end-node;
   wherein the selection and corresponding selection are utilized for managing a user-defined genre-based password.

6. The method of claim 5, further comprising:
   in response to the user selecting a node that is not populated with data that was previously input by the user during a creation of the genre-based tree, denying, to the user, access to the end-node.

7. The method of claim 5, wherein the content that is associated with the end-node is a password for a specific program.

8. The method of claim 5, wherein the content that is associated with the end-node is a hint that describes a password for a specific program.

9. The method of claim 8, wherein the hint includes format requirements for the password for the specific program.

10. A system comprising:
    a processor;
    a data bus coupled to the processor;
    a memory coupled to the data bus; and
    a non-transitory computer-readable medium embodying computer program code, the computer program code comprising instructions executable by the processor and configured for:
       presenting, contents of a first plurality of nodes in a genre-based tree, wherein the first plurality of nodes represent a subcategory of a parent node, wherein the first plurality of nodes include a correct node that contains content that has been input previously by the user, and wherein the first plurality of nodes include at least one incorrect node that contains content that has not been input previously by the user, and wherein the content of the incorrect nodes is automatically generated from an information database corresponding to a same genre as the parent node;

receiving, an input that selects one of the first plurality of nodes;

in response to receiving the selection corresponding to the correct node:
   presenting at least one subsequently lower-level plurality of nodes, wherein the at least one subsequently lower-level plurality of nodes is in the same genre-based tree as the parent node;
   receiving a selection of one of the subsequently lower-level plurality of nodes; and
   repeating the presenting at least one subsequently lower-level plurality of nodes and receiving a selection of one of the subsequently lower-level plurality of nodes until an end-node of the genre-based tree is reached, wherein the end-node is reached only if nodes that correspond with nodes that have been previously populated with data that was input by the user are correctly selected to create a correct pathway in the genre-based tree; and in response to the end-node of the genre-based tree being reached, presenting a content that is associated with the end-node.

11. The system of claim 10, wherein the instructions are further configured for:
   in response to the user selecting a node that is not populated with data that was previously input by the user during a creation of the genre-based tree, denying, to the user, access to the end-node.

12. The system of claim 10, wherein the content that is associated with the end-node is a password for a specific program.

13. The system of claim 10, wherein the content that is associated with the end-node is a hint that describes a password for a specific program.

14. The system of claim 13, wherein the hint includes format requirements for the password for the specific program.

15. The method of claim 1, further comprising, automatically generating, for the first question, a first list of alternative entries generated via an information database corresponding to the genre-based root node, for selection within the user interface, wherein the alternative entries are incorrect answers to the first question.

16. The method of claim 1, further comprising, automatically generating, for the subsequent question, a subsequent list of alternative entries generated via an information database corresponding to the genre-based root node, for selection within the user interface, wherein the alternative entries are incorrect answers to the subsequent question.

* * * * *